United States Patent
Hu (10) Patent No.: US 8,125,548 B2
(45) Date of Patent: Feb. 28, 2012

(54) ANALOG IMAGE SIGNAL PROCESSING CIRCUIT FOR CMOS IMAGE SENSOR

(75) Inventor: Wenge Hu, Guangdong (CN)

(73) Assignee: BYD Company Limited, Guangdong (CN)

( * ) Notice: Subject to any disclaimer, the term of this patent is extended or adjusted under 35 U.S.C. 154(b) by 424 days.

(21) Appl. No.: 12/159,205

(22) PCT Filed: Dec. 28, 2006

(86) PCT No.: PCT/CN2006/003645
§ 371 (c)(1),
(2), (4) Date: Apr. 2, 2009

(87) PCT Pub. No.: WO2007/073695
PCT Pub. Date: Jul. 5, 2007

(65) Prior Publication Data
US 2009/0268054 A1   Oct. 29, 2009

(30) Foreign Application Priority Data

Dec. 29, 2005  (CN) .......................... 2005 1 0121436
Aug. 25, 2006  (CN) .......................... 2006 1 0062313

(51) Int. Cl.
*H04N 3/14*  (2006.01)
*H04N 5/335*  (2006.01)
(52) U.S. Cl. ........ 348/294; 348/298; 348/302; 348/308; 348/312
(58) Field of Classification Search ................. 348/294, 348/298, 302, 308, 312; 250/208.1; 257/290–292
See application file for complete search history.

(56) References Cited

U.S. PATENT DOCUMENTS 5,528,293 A   6/1996  Watanabe
(Continued)

FOREIGN PATENT DOCUMENTS

CN   2718905 Y   8/2005
(Continued)

OTHER PUBLICATIONS

PCT International Search Report for PCT Counterpart Application No. PCT/CN2006/003645 and Full English translation, 4 pgs (Apr. 5, 2007).

(Continued)

*Primary Examiner* — Yogesh Aggarwal
(74) *Attorney, Agent, or Firm* — Blakely, Sokoloff, Taylor & Zafman LLP.

(57) ABSTRACT

An image signal processing circuit for CMOS image sensor comprises a differential operational amplifier, input stage capacitors, and output stage capacitors. The input stage capacitors comprise a first positive input stage switching capacitor array and a first negative input stage switching capacitor array. The first positive input stage switching capacitor array is configured to input analog image signals, a control end of the first positive input stage switching capacitor array is connected to a color gain control signal end, and an output end of the first positive input stage switching capacitor array is coupled to a positive input end of the differential operational amplifier. The first negative input stage switching capacitor array is configured to input a reference level signal, a control end of the first negative input stage switching capacitor array is connected to the color gain control signal end, and an output end of the first negative input stage switching capacitor array is coupled to a negative input end of the differential operational amplifier. The output stage capacitors are connected between the output end and the input end of the differential operational amplifier. In the present invention, two or more control functions are implemented with a single circuit, therefore, with the imaging effects guaranteed, the circuit structure is simplified, the size of the CMOS image sensor chip is reduced, and thus the cost is reduced. The present invention meets the developing trend of product miniaturization.

2 Claims, 5 Drawing Sheets

U.S. PATENT DOCUMENTS 6,529,237 B1    3/2003    Tsay et al.
6,617,567 B2 *    9/2003    Mukherjee et al. ....... 250/214 A
6,894,721 B1    5/2005    Okada et al.

FOREIGN PATENT DOCUMENTS

| | | |
|---|---|---|
| CN | 1671077 A | 9/2005 |
| EP | 0 138 260 A2 | 4/1985 |
| JP | 2002-320146 | 10/2002 |
| JP | 2003-052048 | 2/2003 |

OTHER PUBLICATIONS

Written Opinion of the International Search Authority for PCT Counterpart Application No. PCT/CN2006/003645 and Full English translation, 6 pgs (Apr. 5, 2007).

Supplementary European Search Report for EP08840681.8-1241, 13 pages (Oct. 30, 2009).

Letter dated Apr. 9, 2010 Translating Notice of Reasons for Preliminary Rejection for Korean Counterpart Application No. 2008-7017295, 4pgs. (Redacted).

* cited by examiner

ANALOG IMAGE SIGNAL PROCESSING CIRCUIT FOR CMOS IMAGE SENSOR

CROSS-REFERENCE TO OTHER APPLICATIONS

This is a National Phase of International Application No. PCT/CN2006/003645, filed on Dec. 28, 2006, which claims priority from Chinese Patent Application No. 200510121436.7, filed on Dec. 29, 2005 and Chinese Patent Application No. 200610062313.5, filed on Aug. 25, 2006.

FIELD OF THE INVENTION

The present invention relates to a CMOS image sensor, in particular to an analog image signal processing circuit in CMOS image sensor.

BACKGROUND OF THE INVENTION

As CMOS technique and solid image sensor technique are improved, CMOS image sensors have been developed quickly, and CMOS image sensing technique has substituted CCD sensing technique in low level image and video market. Compared to CCD image sensors, CMOS image sensors have advantages such as lower power consumption, wider dynamic range, higher video processing rate, higher integration level, and lower cost, etc., and are applicable to micro digital camera, portable visual telephone, and PC camera; in addition, CMOS image sensors can also be applied in military reconnaissance and satellites, etc.

Photoelectric coupling components can only sense light intensity but not color information. To sense color information, a color filter is required. Such a color filter is referred to as a Bayer color filter, which comprises a color array composed of RGB three primary colors aligned in a certain order, wherein, each pixel is covered with a filter in a specific color, which only allows the light in a specific color to penetrate and then is sensed and converted into electric signals by the photo diode. Then, the electric signals are output by column driver, sampled by the sampling circuit to obtain analog voltage signals, and sent to the analog signal processing circuit by row and column.

In order to facilitate back-end digital image processing, usually an A/D converter is arranged after the analog signal processing circuit to convert the analog image signals into digital signals. Such an A/D converter usually requires a sampling rate higher than 20 MHz, and therefore pertains to a high speed ADC and typically requires differential signal input. However, the signal VIN from the image pixel array are single-end signal, and they need to be converted into differential signal in order to match the ADC. In addition, in the processing in analog signal circuit, differential mode has significant advantages over single-end mode, wherein, one of the important advantages is the higher anti-interference capability against environment noise, and another advantage is increased voltage swing. Therefore, differential mode has become a main option for modern high-performance analog circuits and mixed signal circuits.

Due to the defects in CMOS processing, the characteristic parameters of transistors and the parameters of passive components are not homogeneous; therefore, Fixed Pattern Noise (FPN) exists in CMOS image sensors; FPN is intrinsic noise in CMOS image sensors and human eyes are particularly sensitive to such noise; therefore, FPN has particularly adverse effect to image quality of CMOS image sensors, and must be eliminated. Conventional image sensors employ a sampling circuit (referred to as Correlate Doubled Sampling (CDS) circuit) to eliminate FPN; however, such an approach can only eliminate the noise caused by non-homogeneity of the circuits previous to the sampling circuit but cannot eliminate the FPN noise caused by the difference among the components in the circuits after the sample circuit.

In order to ensure that the image from the CMOS image sensor can reflect the actual colors and brightness of the physical scene correctly, typically color gain adjustment and exposure adjustment must be applied in the analog signal processing circuit of the image sensor.

In the back-end digital image signal process (ISP), especially in the gamma correction process, usually the black level needs to be ascertained; if the black level is inappropriate, the contrast of the image after gamma correction will be affected severely; therefore, by adjusting the black level, better image quality can be attained after gamma calibration.

In the existing CMOS image sensor technique, four different color signals in the analog signal processing circuit usually employ four circuits or two circuit stages, respectively, to implement color gain control, exposure control, black level control, and FPN elimination; furthermore, FPN elimination is carried out in each column; therefore, the FPN elimination result depends on non-homogeneity of each column circuit, which is to say, FPN cannot be eliminated completely. Moreover, the processing circuit is simple in functionality but complex in structure, and thereby causes increased chip size. However, in present IC market with the fierce competition, reducing chip size and cost without degrading imaging quality has become a key factor in the survival of CMOS image sensor designers and manufacturers.

In order to solve above problem, a different architecture is put forward in the present invention, wherein, the pixel signals are separated into two streams by odd and even columns, and then processed by two symmetric analog signal processing circuits respectively, and combined to the same ADC for A/D conversion. Each analog signal processing circuit (Branch A or Branch B) processes pixel signals of two different colors. Thus, signals of different colors are processed through a switching capacitor circuit in the analog signal processing circuit structure under time sequence control, so as to implement different color gain control, exposure control, and black level control, and thereby the adjustment capability of the processing circuit is improved, the image noise is reduced, and the circuit structure is further simplified, the chip size and the cost are reduced. In the architecture provided in the present invention, CDS is carried out in each column, but its subtraction operation is identical to all odd and even columns, i.e., CDS subtraction operation is implemented for all odd and even columns in the corresponding analog signal processing circuit, and thereby the FPN is eliminated completely and thus independent to non-homogeneity of each column.

SUMMARY OF THE INVENTION

Figure 1:
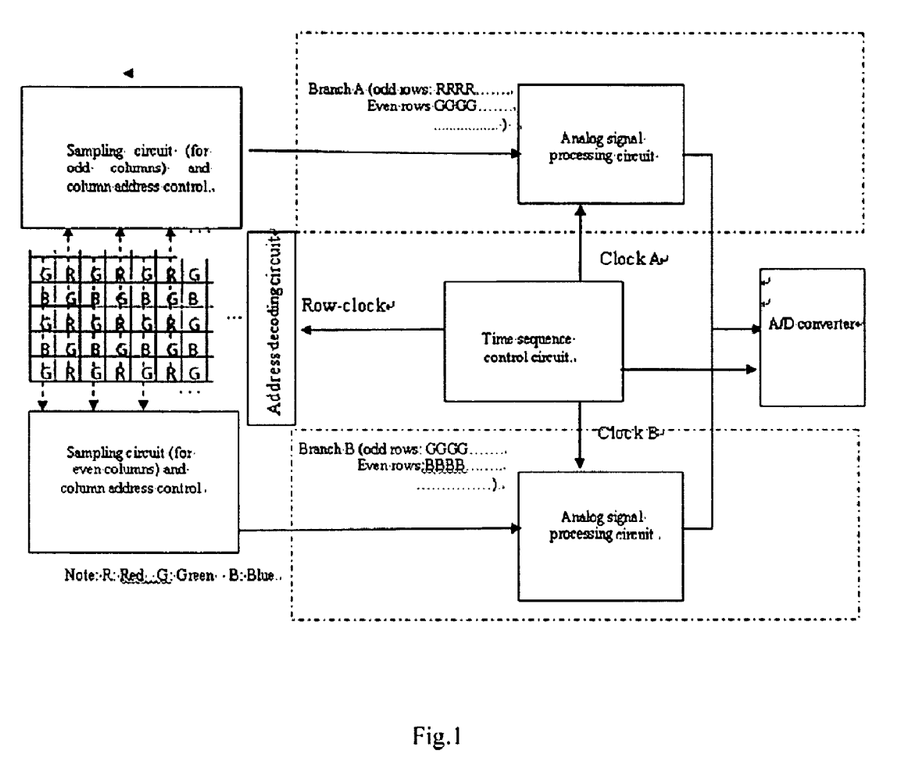
FIG. 1 is a block diagram of the signal processing architecture provided in the present invention.
Figure 2:
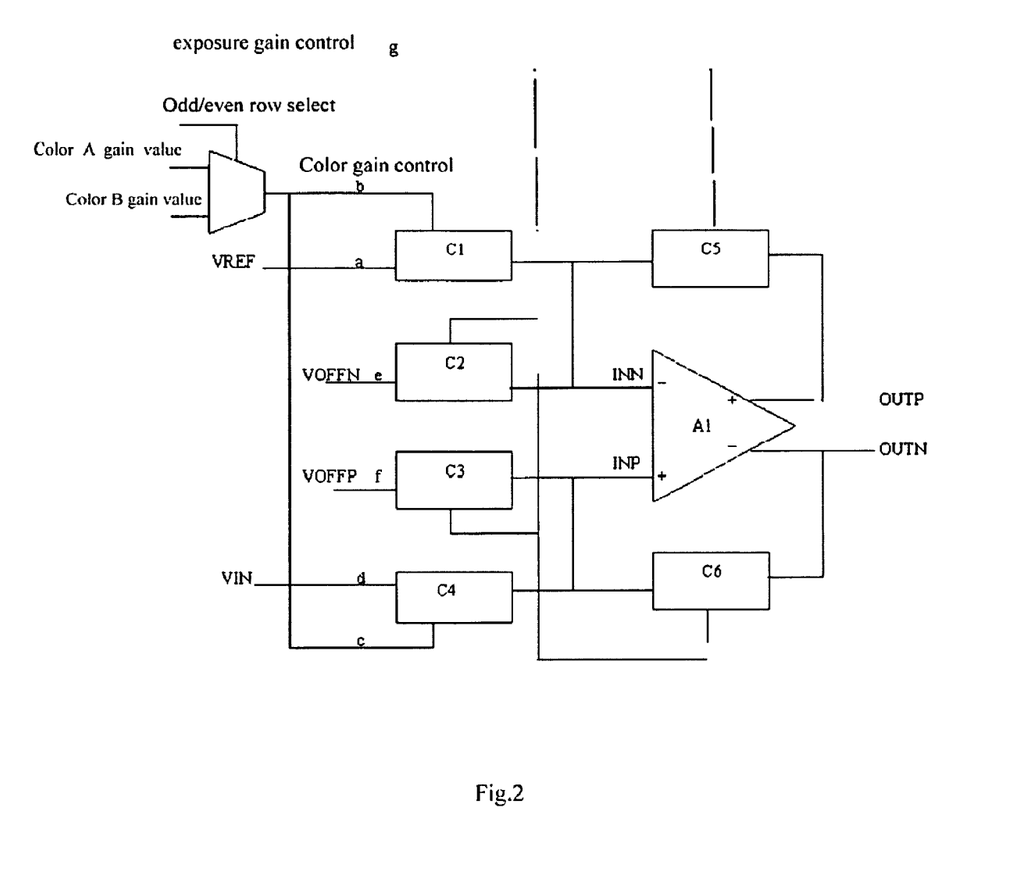
FIG. 2 is a block diagram of the analog image signal processing circuit provided in the present invention.

The present invention discloses an analog image processing architecture and an analog image processing circuit for CMOS image sensor, which comprise: an analog image signal processing circuit—differential operational amplifier, which is configured to convert the single-end photoelectric signals of different colors from a pixel array into differential signals; and, a time sequence control circuit configured to process the signals in two branches, as shown in FIG. 1 and FIG. 2.

In the analog image signal processing architecture, a pixel array is separated into two groups of signals of different colors—Branch A and Branch B, wherein, Branch A is connected to odd columns in the pixel array, while Branch B is connected to even columns in the pixel array; the signals received by each processing circuit are separated by odd and even rows, so that each row comprises signals of a specific color for processing. A Row-Clock controls the row decoder to parse the address. Suppose the pixel in the first row and first column in the pixel matrix is in red color, when the row address decoder outputs the first signal row, all the signals sent from Branch A to the analog signal processing circuit are voltage signals of red light (R), and all the signals sent from Branch B to the analog signal processing circuit are voltage signals of green light (C); when the row address decoder outputs the second signal row, all the signals sent from Branch A to the analog signal processing circuit are voltage signals of green light (G), while all the signals sent from Branch B to the analog signal processing circuit are voltage signals of blue light (B), and so on. Thus, signals of different colors can be sampled and sent to the analog signal processing circuit. Each circuit will process signals of two colors, and signals of the same color are processed in the processing duration for each row; therefore, color gain control of the analog signal processing circuit can be improved. To control color gain, the gain value can be switched for the color gain control port for each circuit when the processing of a row is started, according to the color of the row.

An output end of the analog image signal processing circuit (shown in FIG. 2)—differential operational amplifier is configured to connect to an A/D converter; the analog image signal processing circuit further comprise input stage capacitors and output stage capacitors, the input stage capacitors comprise a first positive input stage switching capacitor array and a first negative input stage switching capacitor array; an input end of the first positive input stage switching capacitor array is configured to input analog image signals, a control end of the first positive input stage switching capacitor array is connected to a color gain control signal end, and an output end of the first positive input stage switching capacitor array is coupled to a positive input end of the differential operational amplifier; an input end of the first negative input stage switching capacitor array is configured to input a reference level signal, a control end of the first negative input stage switching capacitor array is connected to a color gain control signal end, and an output end of the first negative input stage switching capacitor array is coupled to a negative input end of the differential operational amplifier; the output stage capacitors are connected between the output end and the input end of the differential operational amplifier.

Figure 3:
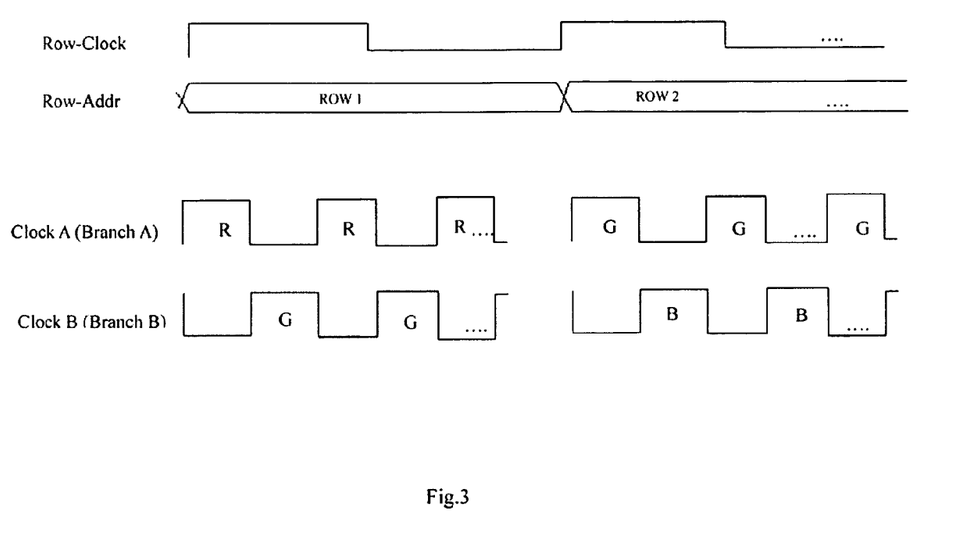
FIG. 3 is a time sequence diagram of the present invention.

Wherein, the input end of the first positive input stage switching capacitor array inputs exposure photoelectric analog image signals in the positive half cycle of Clock A or Clock B, and inputs pre-exposure analog image signals in the negative half cycle of Clock A or Clock B; Clock A and Clock B are clock signals at the same frequency in phase reverse to each other, as shown in FIG. 3.

In order to implement exposure control, a further improvement of the present invention is: the output stage capacitors comprise a positive output stage switching capacitor array and a negative output stage switching capacitor array, the positive output stage switching capacitor array is connected between a positive output end and the negative input end of the differential operational amplifier, the negative output stage switching capacitor array is connected between a negative output end and the positive input end of the differential operational amplifier, and the control ends of the positive/negative output stage switching capacitor array are connected to an exposure gain control signal end.

In order to implement black level control, a further improvement of the present invention is: the input stage capacitors further comprise a second positive input stage switching capacitor array and a second negative input stage switching capacitor array, a input end of the second positive input stage switching capacitor array is configured to input first offset voltage, and an output end of the second positive input stage switching capacitor array is coupled to a positive input end of the differential operational amplifier; a input end of the second negative input stage switching capacitor array is configured to input a second offset voltage, and an output end of the second negative input stage switching capacitor array is coupled to a negative input end of the differential operational amplifier.

In order to ensure that the black level is not changed during exposure adjustment, a control end of the second positive input stage switching capacitor array and a control end of the second negative input stage switching capacitor array are connected to an exposure gain control signal end, respectively.

To achieve the above objectives, the present invention further discloses an analog image signal processing circuit for CMOS image sensor, which comprises a differential operational amplifier configured to convert single-end analog image signals into differential signals output, output ends of the differential operational amplifier is configured to connect to an A/D converter; the analog image signal processing circuit further comprises input stage capacitors and output stage capacitors, the input stage capacitors comprise a second positive input stage switching capacitor array and a second negative input stage switching capacitor array; a input end of the second positive input stage switching capacitor array is configured to input analog image signals and a first offset voltage signal, and an output end of the second positive input stage switching capacitor array is coupled to a positive input end of the differential operational amplifier; a input end of the second negative input stage switching capacitor array is configured to input a second offset voltage signal, and an output end of the second negative input stage switching capacitor is coupled to a negative input end of the differential operational amplifier; the output stage capacitors are connected between the output end and the input end of the differential operational amplifier.

In order to implement exposure control, a further improvement of the present invention is: the output stage capacitors comprise a positive output stage switching capacitor array and a negative output stage switching capacitor array, the positive output stage switching capacitor array is connected between a positive output end and the negative input end of the differential operational amplifier, the negative output stage switching capacitor array is connected between a negative output end and the positive input end of the differential operational amplifier, and the control ends of the positive/negative output stage switching capacitor array are connected to an exposure gain control signal end.

In order to ensure that the black level is not changed during exposure adjustment, the input end of the second positive input stage switching capacitor array and the control end of the second negative input stage switching capacitor array are connected to the exposure gain control signal end.

In order to implement color gain control, a further improvement of the present invention is: the input stage capacitors further comprise a first positive input stage switching capacitor array and a first negative input stage switching capacitor array; a input end of the first positive input stage switching capacitor array is configured to input analog image signals, a control end of the first positive input stage switching capacitor array is connected to a color gain control signal end, and an output end of the first positive input stage switching capacitor array is coupled to a positive input end of the differential operational amplifier; a input end of the first negative input stage switching capacitor array is configured to input a reference level, the control end of the first negative input stage switching capacitor array is connected to a color gain control signal end, and an output end of the first negative input stage switching capacitor array is coupled to a negative input end of the differential operational amplifier. When the address decoding circuit outputs the signals of the first row in the pixel matrix, the signals in Branch A from the sample circuit are voltage signals of red light (R), and the signals in Branch B from the sample circuit are voltage signals of green light (G); after signal selection through a color gain selection circuit, the analog signal processing circuit for Branch A can control the gain of red light (R) by controlling the gain value of color A, and the analog signal processing circuit for Branch B can control the gain of green light (G) by controlling the gain value of color B. When the address decoding circuit outputs the signals of the second row in the pixel matrix, the signals in Branch A are electric signals of green light (G), and the signals in Branch B are electric signals of blue light (B); after signal selection through a color gain selection circuit, the analog signal processing circuit for Branch A can control the gain of green light (G) by controlling the gain value of color A, and the analog signal processing circuit for Branch B can control the gain of blue light (B) by controlling the gain value of color B. Thus, color gain control can be implemented with one stage of full differential operational amplifying circuits, as shown in FIG. 3.

DETAILED DESCRIPTION OF THE EMBODIMENTS

Figure 4:
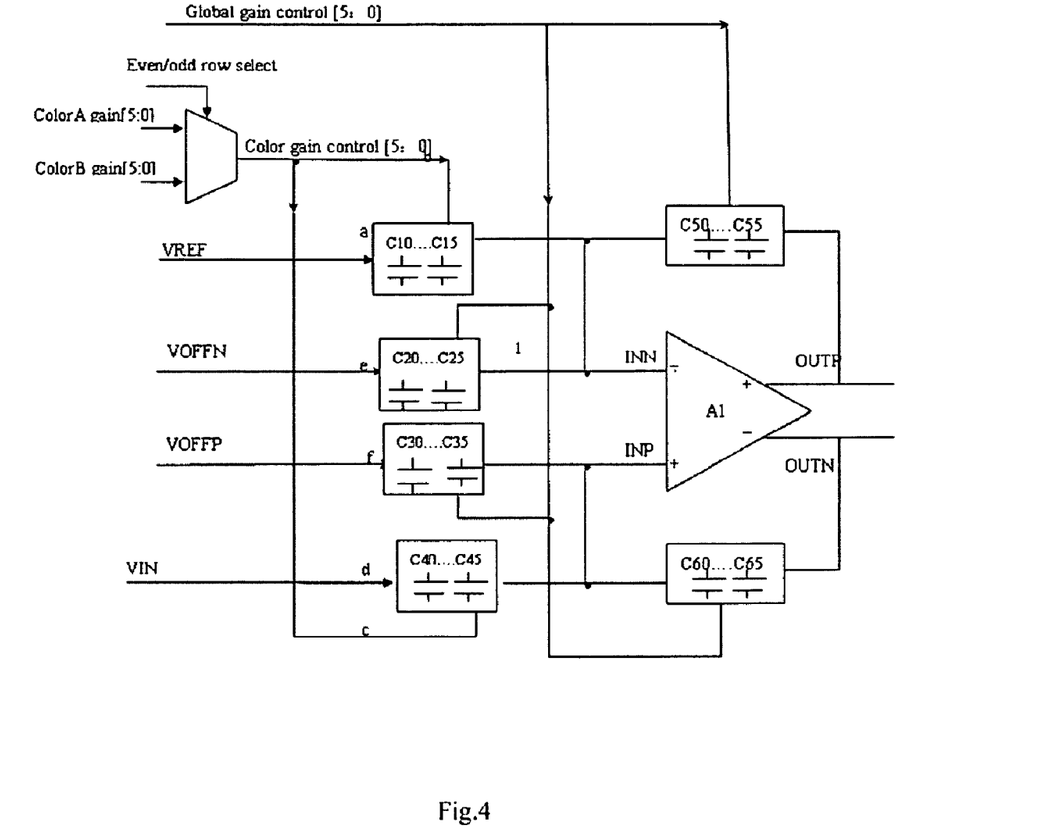
FIG. 4 is a block diagram of an optimal embodiment of the analog image signal processing circuit provided in the present invention.

Hereafter an optimal embodiment of each of the analog image signal processing circuits provided in the present invention will be described. As shown in FIG. 4, the differential operational amplifier A1 is configured to convert single-end analog image signals into differential signal output; the output ends of the differential operational amplifier A1 are connected to the A/D converter; the input stage capacitors comprise a first positive input stage switching capacitor array C4 (composed of capacitor C40 . . . C4$j$ . . . C45 connected in shunt) and a first negative input stage switching capacitor array C1 (composed of capacitor C10 . . . C1$j$ . . . C15 connected in shunt), wherein, C4$j$=C1$j$=$2^j$Ci. A input end d of the first positive input stage switching capacitor array C4 is configured to input analog image signals VIN, a control end c of the first positive input stage switching capacitor array C4 is connected to a color gain control signal end b, and an output end of the first positive input stage switching capacitor array C4 is coupled to the positive input end INP of the differential operational amplifier A1; a input end a of the first negative input stage switching capacitor array C1 is configured to input reference level VREF, a control end of the first negative input stage switching capacitor array C1 is connected to the color gain control signal end b, and an output end of the first negative input stage switching capacitor array C1 is coupled to the negative input end INN of the differential operational amplifier A1; the output stage capacitors comprise a positive output stage switching capacitor array C5 (composed of capacitor C50 . . . C5$j$ . . . C55 connected in shunt) and a negative output stage switching capacitor array C6 (composed of capacitor C60 . . . C6$j$ . . . C65 connected in shunt), wherein, C5$j$=C6$j$=$2^j$Co. The positive output stage switching capacitor array C5 is connected between the positive output end and the negative input end of the differential operational amplifier A1, the negative output stage switching capacitor array C6 is connected between the negative output end and the positive input end of the differential operational amplifier A1, and the control ends of the positive/negative output stage switching capacitor array C5/C6 are connected to the exposure gain control signal end g.

The input stage capacitors can further comprise a second positive input stage switching capacitor array C3 (composed of capacitor C30 . . . C3$j$ . . . C35 connected in shunt) and a second negative input stage switching capacitor array C2 (composed of capacitor C20 . . . C2$j$ . . . C25 connected in shunt), wherein, C3$j$=C2$j$=$2^j$Ci. A input end f of the second positive input stage switching capacitor array C3 is configured to input a first offset voltage VOFFP, and an output end of the second positive input stage switching capacitor array C3 is connected to the positive input end of the differential operational amplifier A1; a input end e of the second negative input stage switching capacitor array C2 is configured to input a second offset voltage VOFFN, and an output end of the second negative input stage switching capacitor array C2 is connected to the negative input end of the differential operational amplifier A1. The control end of the second positive input stage switching capacitor array C3 and the control end of the second negative input stage switching capacitor array C2 are connected to the exposure gain control signal end g.

A full differential operational amplifier is employed in this embodiment, wherein, one end of the full differential operational amplifier is connected to the signals VIN from the image sensor array and the other end is connected to a fixed reference level VREF; with the characteristic of full differential operational amplifier, conversion from single-end signal to differential signal can be implemented. Thus, the dynamic noise of the imaging chip can be suppressed well.

With the characteristic of switching capacitor circuit, the exposure signal and the pre-exposure signal (reset level) are sampled for the pixels respectively, and then subtraction operation is carried out to obtain clean signal. At the input end d of the first positive input stage switching capacitor array C4, the exposure signal VIN1 is input in the positive half cycle of Clock A or Clock B, and the pre-exposure signal VIN2 is input in the negative half cycle of Clock A or Clock B. On the basis of charge balance theory, if the entire circuit is reset in the positive half cycle of the clock, the difference ΔVIN (VIN2−VIN1) between the two signals can be obtained in the negative half cycle of the clock, so that the non-homogeneity of characteristic parameters of transistors and other similar or relevant interference signals and noises can be removed, and thereby FPN can be eliminated.

The transfer function for above circuit is: Vout=Vin*(Cin/Cout)+Voffset
Wherein, Vout=OUTP−OUTN, Vin=ΔVIN, Voffset=2VOFFP−2VOFFN, Cin is the total input capacitance, and Cout is the total output capacitance. VOFFP and VOFFN are the first offset voltage and the second offset voltage, respectively.

It is seen from above expression that the signal gain can be regulated by adjusting the capacitance of input stage capacitor array or output stage capacitor array; therefore, by controlling the color gain control signal and adjusting the first positive input stage switching capacitor array C4 and the first negative input stage switching capacitor array C1 accordingly when different color signals (R, G, B) are input, so as to change the input capacitance, the gain values of Red, Green, and Blue signals can be regulated respectively, and consequently color gain control can be implemented and thus the color difference signals can be eliminated.

When the address decoder outputs the first row of signals, in the positive half cycle of CLOCK A, all the signals sent from Branch A to the analog signal processing circuit are signals of red light: in the positive half cycle of CLOCK B, all the signals sent from Branch B to the analog signal processing circuit are signals of green light.

If in the Branch A color gain control [5:0]=101010, then:

$$C1=(2^5+2^3+2^1)Ci, C4=(2^5+2^3+2^1)Ci;$$

if in the Branch B color gain control [5:0]=100100, then:

$$C1=(2^5+2^2)Ci, C4=(2^5+2^2)Ci,$$

thus:
Branch A: $Cin=(2^5+2^3+2^1)Ci$,
Branch B: $Cin=C1=(2^5+2^2)Ci$,
if fix global gain control [5:0]=000001, then C5=C6=Co. calculated with expression Vout=Vin*(Cin/Cout)+Voffset, the gain of red light signals in Branch A is:

$$Vout/Vin=Cin/Cout+Voffset/Vin=(2^5+2^3+2^1)Ci/Co+Voffset/Vin,$$

the gain of green light signals in Branch B is:

$$Vout(Vin=Cin/Cout+Voffset/Vin=(2^5+2^2)Ci/Co+Voffset/Vin.$$

When the address decoder outputs the second row, in the positive half cycle of CLOCK A, all the signals sent from Branch A to the analog signal processing circuit are signals of green light; in the positive half cycle of CLOCK B, all the signals sent from Branch B to the analog signal processing circuit are signals of blue light.

If in the Branch A color gain control [5:0]=100010, if $C1=(2^5+2^1)Ci, C4=(2^5+2^1)Ci$;
if in the Branch B color gain control [5:0]=100001, then $C1=(2^5+2^0)C1, C4=(2^5+2^0)Ci$,
thus:
Branch A: $Cin=(2^5+2^1)Ci$,
Branch B: $Cin=C1=(2^5+2^0)Ci$,
if fix global gain control [5:0]=000001,
then, the signal gain of green light in Branch A is:

$$Vout/Vin=Cin/Cout+Voffset/Vin=(2^5+2^1)Ci/Co+Voffset/Vin,$$

the signal gain of blue light in Branch B is:

$$Vout/Vin=Cin/Cout+Voffset/Vin=(2^5+2^0)Ci/Co+Voffset/Vin.$$

Thus, color gain control for different colors is implemented. The time sequence diagram is shown in FIG. 4.

It is seen from above transfer function that after the capacitor at the input end is adjusted, Cin is a fixed value; then, the positive output stage switching capacitor array C5 and negative output stage switching capacitor array C6 are adjusted with the exposure gain control signal end g, so as to change the output stage capacitance; thus, the gain values of the three colors can be changed, and therefore the gain values of all color signals can be adjusted simultaneously, and exposure gain (i.e. global gain) control can be implemented to set the image brightness to the target value.

When the address decoder outputs the signals of the first row, all the signals sent from Branch A to the analog signal processing circuit are signals of red light, while all the signals sent from Brach B to the analog signal processing circuit are signals of green light.

If the color gain control in Branch A is fixed as color gain control [5:0]=000001.
the color gain control in Branch B is fixed as color gain control [5:0]=0000010,
when global gain control [5:0]=100000,
the gain of red light in Branch A is:

$$Vout/Vin=Cin/Cout+Voffset/Vin=Ci/2^5Cout+Voffset/Vin,$$

the gain of green light in Branch B is:

$$Vout/Vin=Cin/Cout+Voffset/Vin=2^1Ci/2^5Cout+Voffset/Vin.$$

when global gain control [5:0]=0100000,
the gain of red light in Branch A is:

$$Vout/Vin=Cin/Cout+Voffset/Vin=Ci/2^4Cout+Voffset/Vin,$$

the gain of green light in Branch B is:

$$Vout/Vin=Cin/Cout+Voffset/Vin=2^1Ci/2^4Cout+Voffset/Vin.$$

When the address decoder outputs the signals of the second row, all the signals sent from Branch A to the analog signal processing circuit are signals of green light, while all the signals sent from Brach B to the analog signal processing circuit are signals of blue light.

If the color gain control in Branch A is fixed as color gain control [5:0]=000001,
the color gain control in Branch B is fixed as color gain control [5:0]=0000010,
when global gain control [5:0]=100000,
the gain of green light in Branch A is:

$$Vout/Vin=Cin/Cout+Voffset/Vin=Ci/2^5Cout+Voffset/Vin,$$

the gain of blue light in Branch B is:

$$Vout/Vin=Cin/Cout+Voffset/Vin=2^1Ci/2^5Cout+Voffset/Vin.$$

when global gain control [5:0]=0100000,
the gain of green light in Branch A is:

$$Vout/Vin=Cin/Cout+Voffset/Vin=Ci/2^4Cout+Voffset/Vin,$$

the gain of blue light in Branch B is:

$$Vout/Vin=Cin/Cout+Voffset/Vin=2^1Ci/2^4Cout+Voffset/Vin.$$

Therefore, even the color gain controls in Branch A and Branch B is kept constant, the four color signals will change as the global gain control is adjusted. Thus, exposure gain control can be implemented.

It is seen from above transfer function Vout=Vin*(Cin/Cout)+Voffset that, when the black level signal Vin(ΔVIN) is zero (i.e., the exposure signal level is equal to the pre-exposure signal level (reset level)), Vout=Voffset, and Voffset can be regulated by adjusting the DC level of the first and second input offset voltage VOFFP and VOFFN for the second positive input stage switching capacitor array C3 and the second negative input stage switching capacitor array C2, and thereby the output from the analog-digital converter (ADC) can be regulated, so that the black level value can be controlled at the expected value, and thus black level control can be implemented.

When the positive output stage switching capacitor array C5 and the negative output stage switching capacitor array C6 are adjusted to control exposure gain, the offset voltage Voffset will be affected if the second positive input stage switching capacitor array C3 and the second negative input stage switching capacitor array C2 are kept unchanged. Therefore, the control end of the second positive input stage switching capacitor array C3 and the control end of the second negative input stage switching capacitor array C2 are connected to the exposure gain control signal end g, so that simultaneously the exposure gain control signal g can be used to control the second positive input stage switching capacitor array C3 and the second negative input stage switching capacitor array C2 at the same way, and therefore the black level of the image will not be affected.

It is seen from above analysis that in this embodiment, color gain control, exposure gain control, and black level control are implemented with the same circuit; in addition, dynamic noise and FPN are eliminated at the same time.

Of cause, in an optimal embodiment, as for the capacitors C1$j$, C2$j$, C3$j$, C4$j$ and C5$j$, C6$j$ in the input stage capacitor array C1, C2, C3, C4 and the output stage capacitor array C5 and C6, "$j$" can be 3, 4, 6, or 7; accordingly, the control bits for color gain control and global gain control are [3:0], [4:0], [6:0], and [7:0]. If $j=3$, the number of adjusting orders for color gain control and exposure gain control in such an embodiment is only $2^3$; if $j=4$, the number of adjusting orders for color gain control and exposure gain control in such an embodiment is $2^4$; if $j=6$, the number of adjusting orders for color gain control and exposure gain control in such an embodiment is $2^6$; if $j=7$, the number of adjusting orders for color gain control and exposure gain control in such an embodiment is $2^7$. The higher the value J is, the higher the resolution of color gain control and exposure gain control will be.

In an optimal embodiment, the input stage capacitors may not include the second positive input stage switching capacitor array C3 and the second negative input stage switching capacitor array C2; the offset voltage VOFFP and VOFFN can be fed to the differential operational amplifier A1 through the first positive input stage switching capacitor array C4 and the first negative input stage switching capacitor array C1, or they can be omitted. That embodiment utilizes one same circuit to implement color gain control and exposure gain control, and further delivers dynamic noise and FPN elimination function.

In an optimal embodiment, the input stage capacitors may not include the first positive input stage switching capacitor array C4 and the first negative input stage switching capacitor array C1; the analog image signals VIN are fed to the positive input end of the differential operational amplifier A1 through the second positive input stage switching capacitor array C3. That embodiment utilizes one same circuit to implement color gain control and black level control, and further delivers dynamic noise and FPN elimination function.

Figure 5:
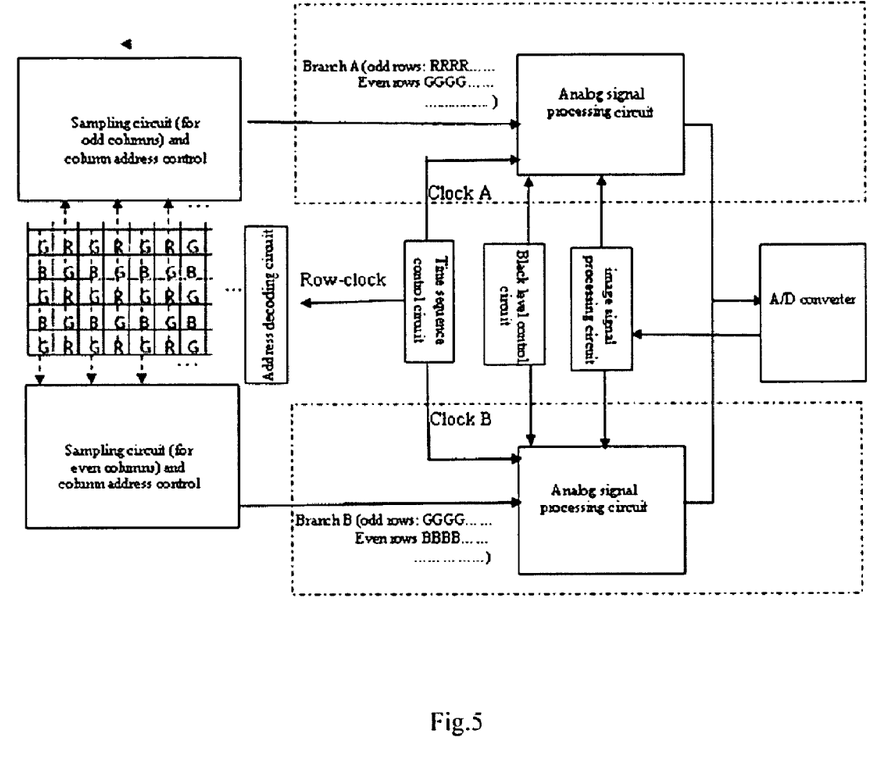
FIG. 5 is a schematic diagram of the connections between the present invention and other external circuits.

FIG. 5 is a schematic diagram of connections with other circuits in an optimal embodiment of the present invention. It is seen from FIG. 5 that the output end of the analog signal processing circuit is connected to the ADC, the image signal processing (ISP) circuit outputs color gain signal b and exposure gain signal g according to the automatic adjustment function, wherein, the color gain signal b is used to adjust the capacitance of the first positive input stage switching capacitor array C4 and the first negative input stage switching capacitor array C1, and thereby change the input capacitance and implement color gain control. The exposure gain signal g is used to adjust the positive input stage switching capacitor array C5 and the negative input stage switching capacitor array C6, so as to implement exposure gain control; the offset voltage VOFFP and VOFFN are fed from the black level control circuit to the second positive input stage switching capacitor array C3 and the second negative input stage switching capacitor array C2, to implement black level control.

What is claimed:

1. An analog image signal processing circuit for CMOS image sensor, which comprises a differential operational amplifier configured to convert single-end analog image signals into differential signal output, with an output end of the differential operational amplifier coupled to an A/D converter;
wherein the analog image signal processing circuit for CMOS image sensor further comprises input stage capacitors and output stage capacitors, the input stage capacitors comprise a second positive input stage switching capacitor array and a second negative input stage switching capacitor array;
an input end of the second positive input stage switching capacitor array is configured to input analog image signals and a first offset voltage signal, and an output end of the second positive input stage switching capacitor array is coupled to a positive input end of the differential operational amplifier;
an input end of the second negative input stage switching capacitor array is configured to input a second offset voltage, and an output end of the second negative input stage switching capacitor array is coupled to a negative input end of the differential operational amplifier;
wherein the output stage capacitors comprise a positive output stage switching capacitor array and a negative output stage switching capacitor array, the positive output stage switching capacitor array is being coupled between a positive output end and the negative input end of the differential operational amplifier, the negative output stage switching capacitor array is being coupled between and negative output end and the positive input end of the differential operational amplifier; the control ends of the positive output stage switching capacitor array and the negative output stage switching capacitor array being coupled to an exposure gain control signal end;
wherein a control end of the second positive input stage switching capacitor array and a control end of the second negative input stage switching capacitor array are coupled to the exposure gain control signal end.

2. The processing circuit according to claim 1, wherein the input stage capacitors further comprise a first positive input stage switching capacitor array and a first negative input stage switching capacitor array;
an input end of the first positive input stage switching capacitor array is configured to input analog image signals, a control end of the first positive input stage switching capacitor array is coupled to a color gain control signal end, and an output end of the first positive input stage switching capacitor array is coupled to the positive input end of the differential operational amplifier;
an input end of the first negative input stage switching capacitor array is configured to input a reference level, a control end of the first negative input stage switching capacitor array is coupled to the color gain control signal end, and an output end of the first negative input stage switching capacitor array is coupled to the negative input end of the differential operational amplifier.

* * * * *